INVENTOR
Arlington Moore
BY
H. H. Dyke
ATTORNEY

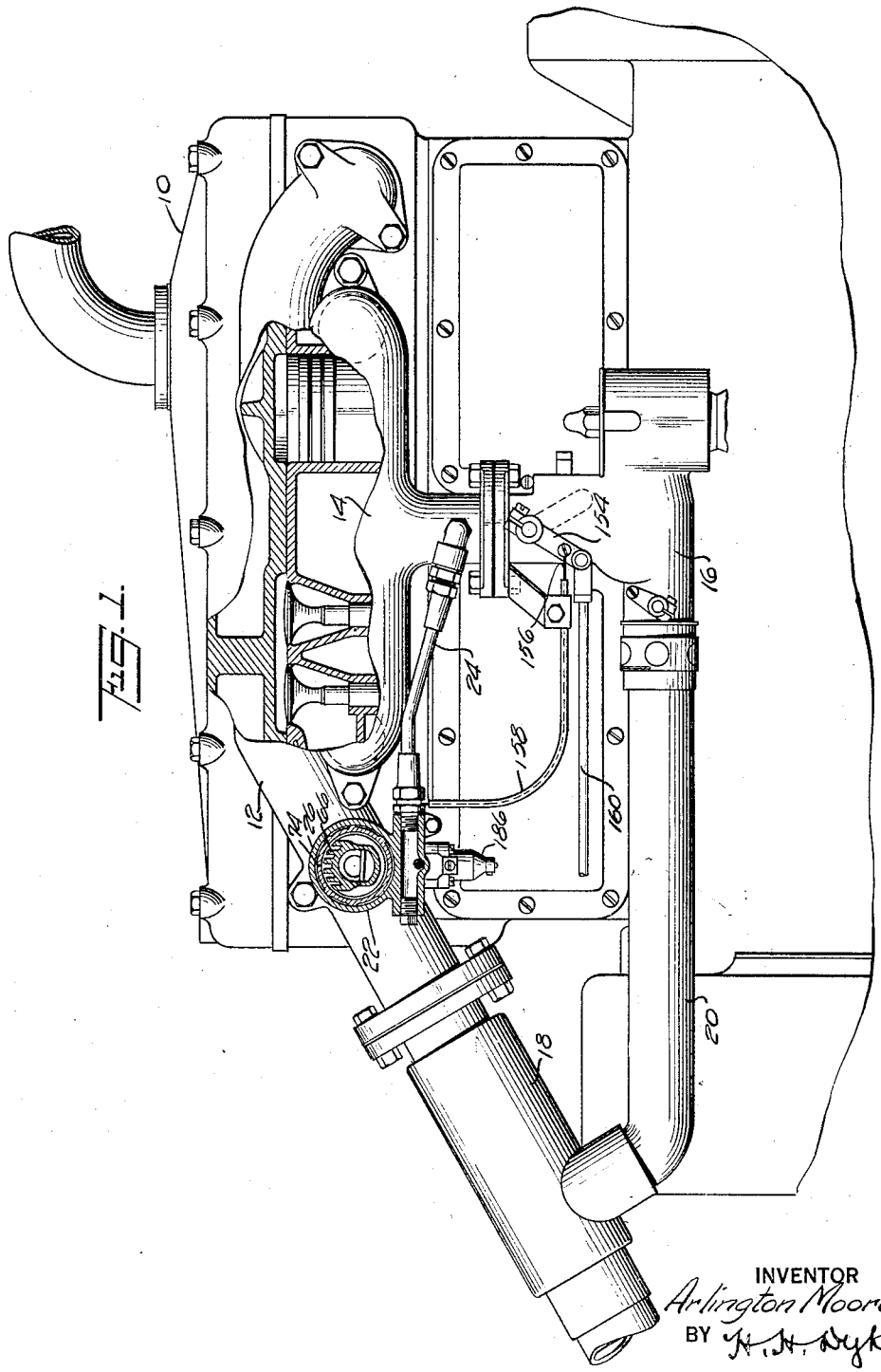

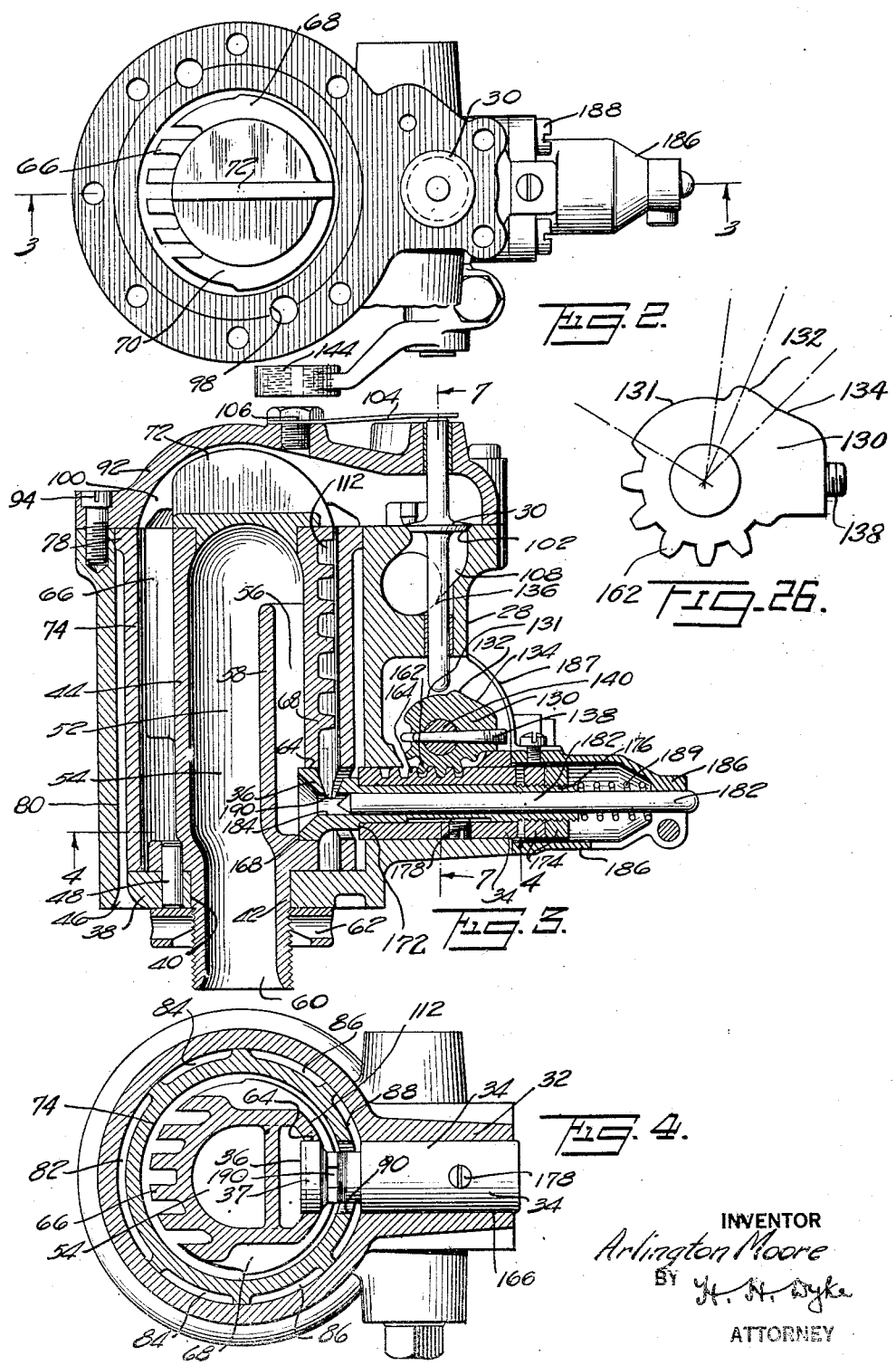

June 24, 1930.  A. MOORE  1,766,671
MIXTURE CONVERSION APPARATUS FOR INTERNAL COMBUSTION ENGINES
Original Filed April 27, 1925   7 Sheets-Sheet 4
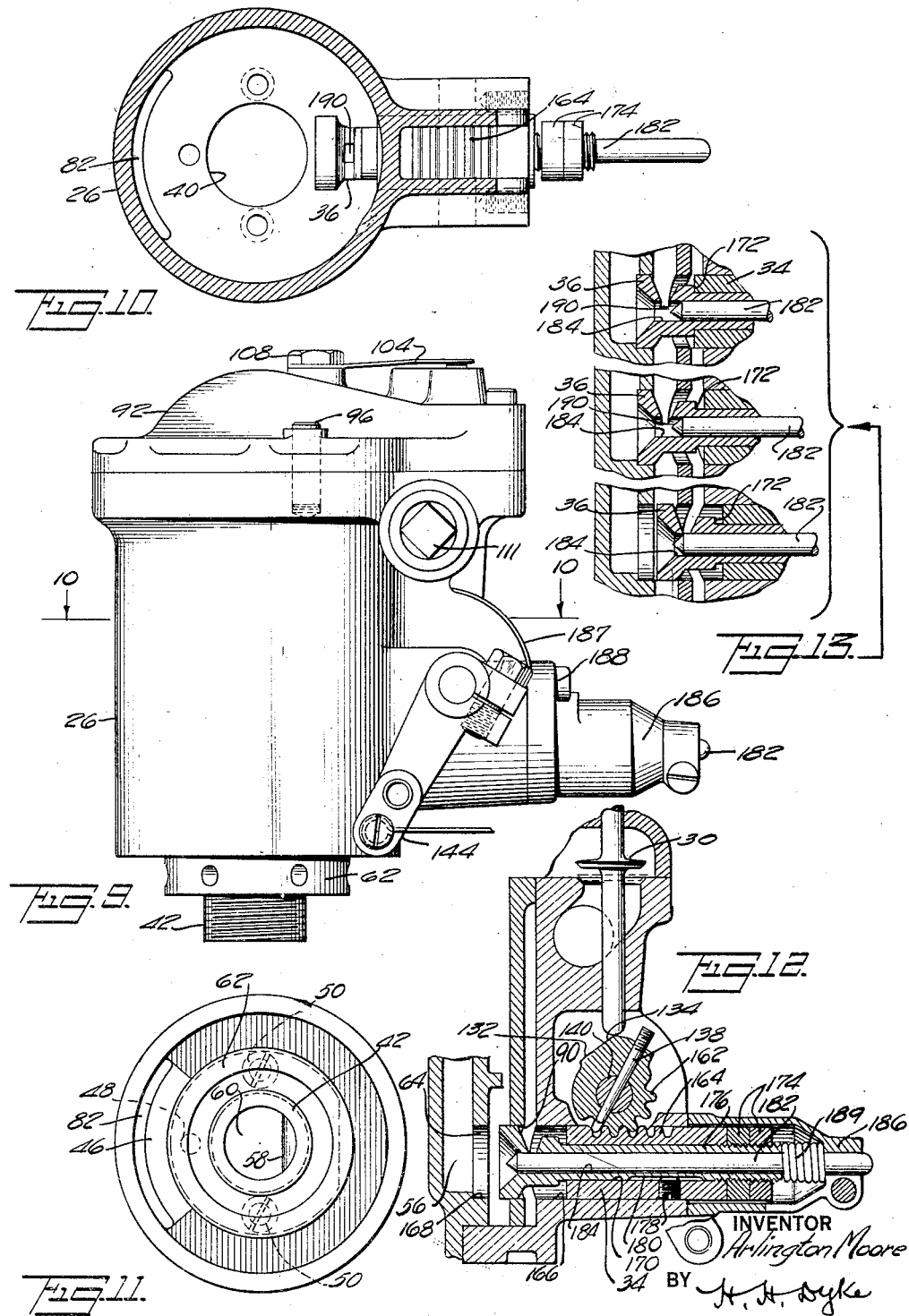

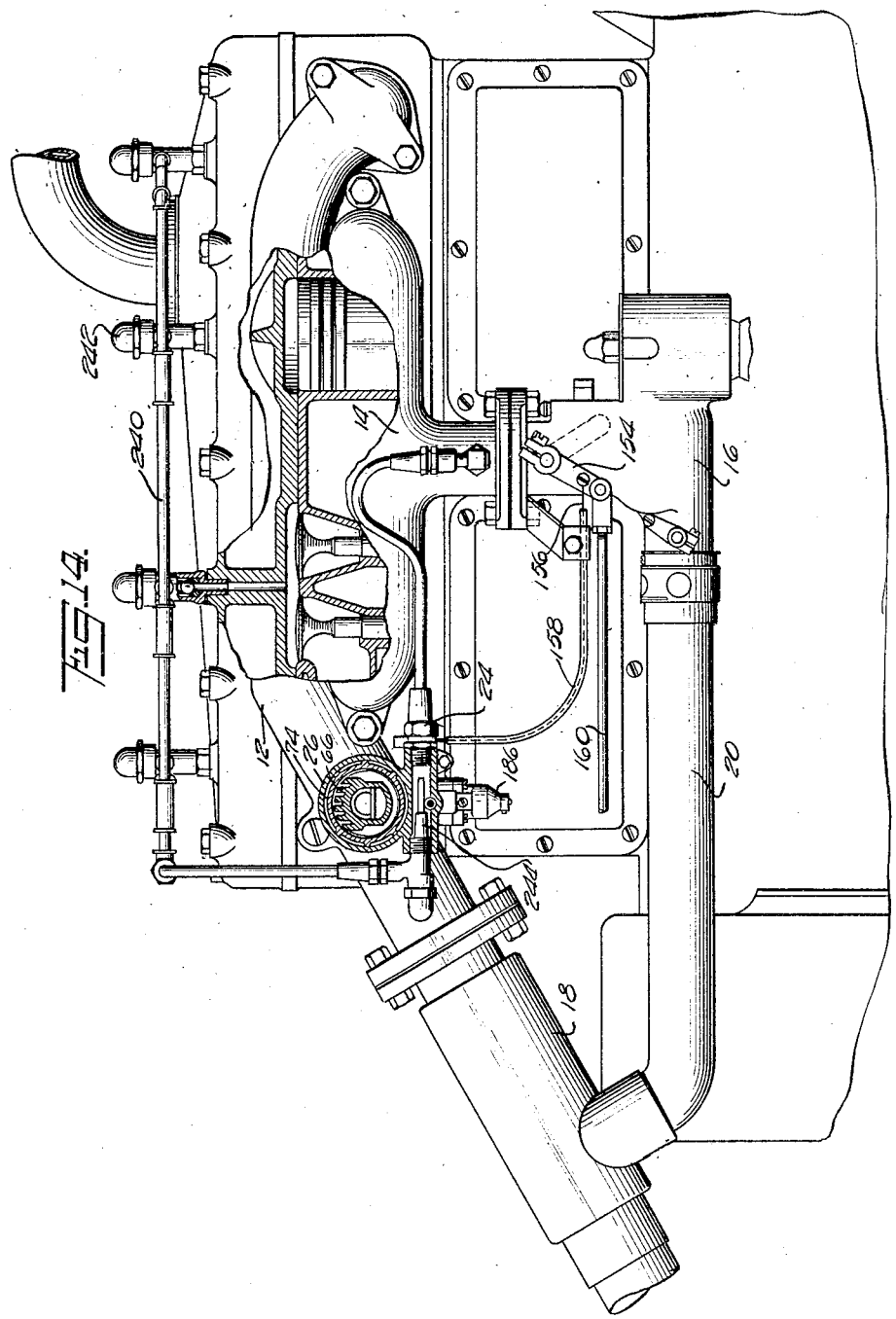

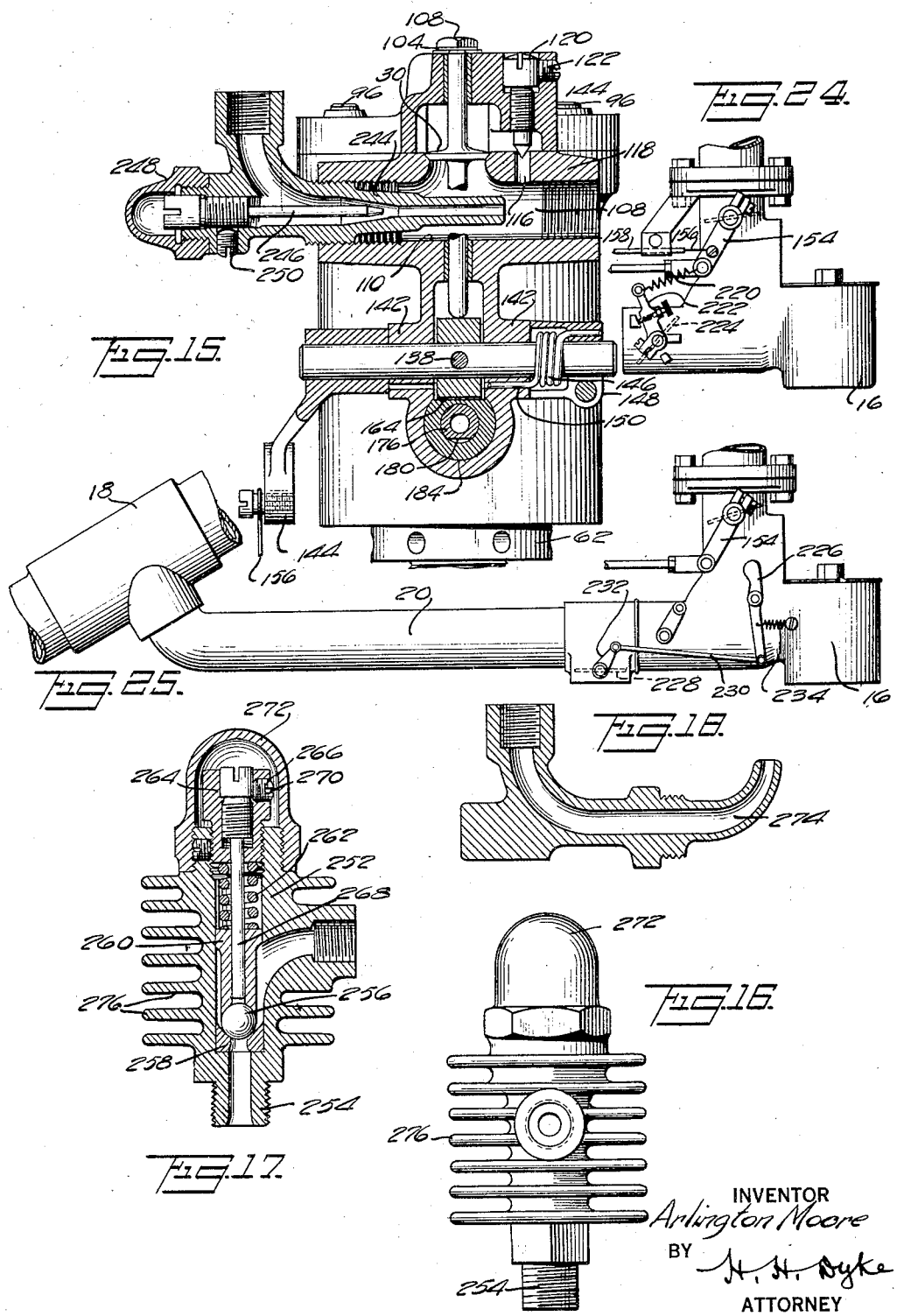

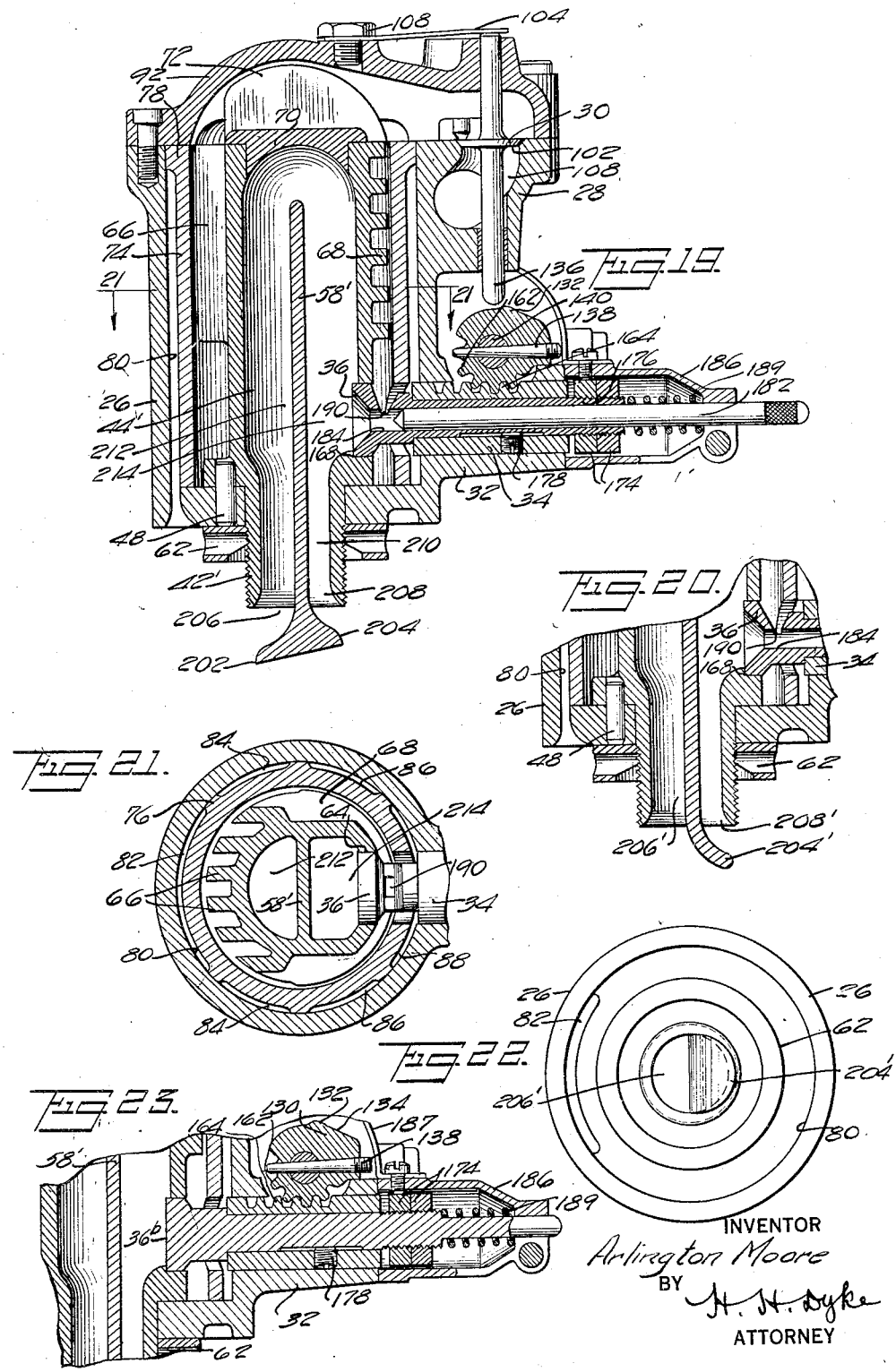

Patented June 24, 1930

1,766,671

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

MIXTURE-CONVERSION APPARATUS FOR INTERNAL-COMBUSTION ENGINES

Application filed April 27, 1925, Serial No. 26,265. Renewed January 17, 1930.

My invention relates to a fuel or mixture conversion device for internal combustion engines adapted to supply to the fuel and air mixture delivered by the carburetor of an internal combustion engine heat units from the engine operation, usually allowed to go to waste with the exhaust, in sufficient amount to convert the relatively wet fuel and air mixture into dry gas before delivery to the engine cylinders, securing complete combustion and elimination of carbon monoxide gas.

An object of the present invention is the simplification in construction and improvement in mechanical efficiency of apparatus disclosed in my earlier copending application serial No. 757,075, filed Dec. 19, 1924.

Another object consists in the provision of supplementary means automatically coming into action when the pressures in the engine cylinder are in excess of a predetermined amount for preventing detonation by relieving the engine pressure and supplying the gases from the engine cylinder in comparatively small quantity, but at high temperature and pressure to augment the temperature and pressure at which the hot gases are supplied by the conversion apparatus.

Figure 5:
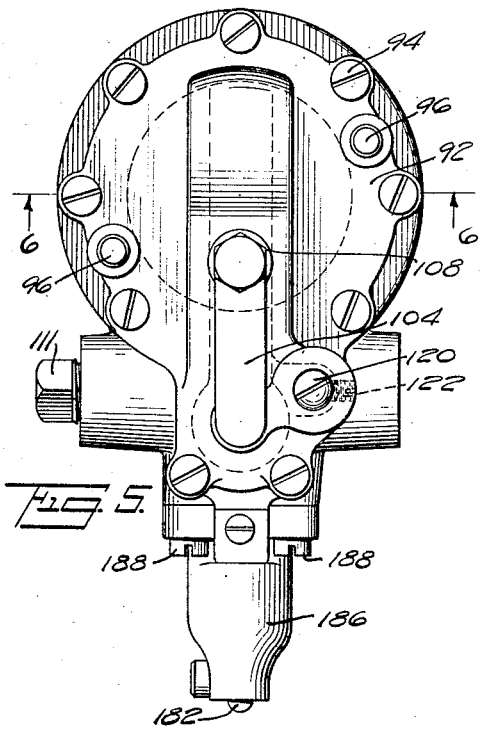
Figure 6:
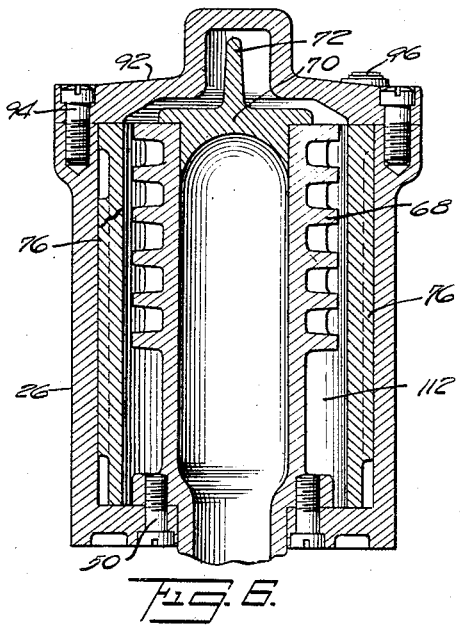
Figure 7:
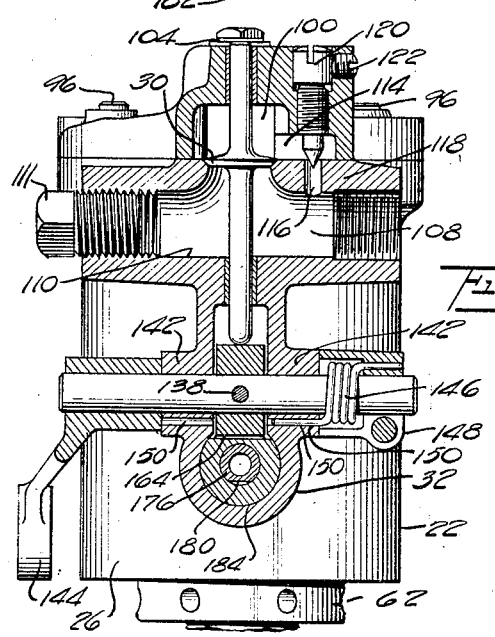
Figure 8:
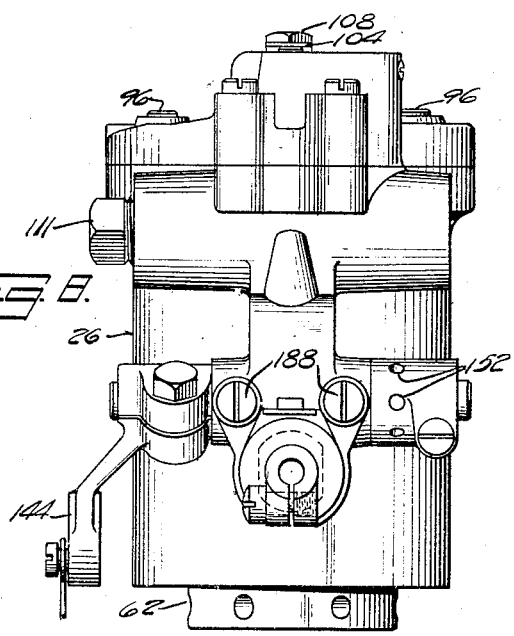

In the accompanying drawings showing embodiments of the invention illustrated for affording an understanding of the invention, Fig. 1 is a side view with parts broken away of an internal combustion engine equipped with conversion apparatus in accordance with my invention. Fig. 2 is a plan view of the conversion apparatus with the upper or dome casting removed. Fig. 3 is a vertical section on the line 3—3, Fig. 2, with the valves of the conversion apparatus in position corresponding to the closed or substantially closed position of the engine throttle. Fig. 4 is a transverse section on the line 4—4, Fig. 3. Fig. 5 is a plan view. Fig. 6 is a section on the line 6—6, Fig. 5. Fig. 7 is a section taken substantially on the line 7—7, Fig. 3. Fig. 8 is a side elevation of the conversion apparatus. Fig. 9 is an elevation at right angles to Fig. 8 and looking toward the left side of Fig. 8. Fig. 10 is a section on the line 10—10, Fig. 9, with interior parts removed. Fig. 11 is a bottom plan view. Fig. 12 is a detail enlarged section on the same plane as Fig. 3, but showing positions of the movable parts corresponding to wide open engine throttle. Fig. 13 comprises detail sections showing various positions of the valves and related parts and taken on the same plane as Figs. 3 and 12. Fig. 14 is a view similar to Fig. 1 and embodying a modification comprising an injector using gases from the engine cylinders. Fig. 15 is a sectional view similar to Fig. 7, but embodying the injector feature of Fig. 14. Figs. 16 and 17 are respectively side and central vertical sectional views of the pressure relief valve made use of with the apparatus of Figs. 14 and 15. Fig. 18 is a detail view on an enlarged scale of the delivery nozzle made use of for delivery of hot gas to the intake with the injector apparatus of Figs. 14–17. Fig. 19 is a central sectional view of a modified form, making provision for increased exhaust gas circulation through the stove with consequent increased heat delivery. Fig. 20 is a fragmentary section similar to a part of Fig. 19, showing a further modification. Fig. 21 is a section on line 21—21, Fig. 19. Fig. 22 is a bottom plan view of Fig. 20. Fig. 23 is a section similar to a part of Fig. 19 or Fig. 20 and showing an exhaust gas valve with solid stem and without bleed hole. Fig. 24 is a fragmentary detail showing carburetor air choke valve interconnected with the throttle lever. Fig. 25 is a like view showing means for introducing atmospheric air to the carburetor air inlet at and toward wide open engine throttle positions, and Fig. 26 is an enlarged side elevation of the cam and sector member for operating the valves.

The internal combustion engine 10 comprises the usual exhaust manifold 12, intake manifold 14 and carburetor 16. The carburetor 16 preferably takes at least part of its air supply from the exhaust stove 18 through the supply pipe 20 so that the incoming air to the carburetor is heated or warmed. The conversion apparatus 22 mounted on the exhaust manifold 12 is connected by its delivery pipe 24 to the intake manifold, preferably just over or beyond the throttle, that is to say, between the engine cylinders and the throttle.

The conversion apparatus is preferably of cast construction and the parts are designed to simplify the construction and assembly. The principal or casing casting 26 is of generally cup-like formation with a lateral extension 28 for housing the poppet quantity valve 30, and a projection boss 32 below the valve housing portion 28 for receiving the air sleeve valve 34 and the exhaust gas valve 36. The base portion 38 of casing 26 has a hole 40 therein for receiving the neck 42 of the chambered heater 44 and also contains the air inlet passage 46. The heater or stove 44 is doweled in place in the main casting 26 as by dowel pins 48 and secured therein by screws 50 (Fig. 6). Said stove or heater 44 has a circuitous passage 52 therein for exhaust gas, same preferably comprising the main portion 54 extending throughout substantially the length of the stove 44 and the reverse or well portion 56 separated from the portion 54 by the partition wall 58. Passage 54 is open at its inlet end 60 to the interior of the exhaust manifold 12 into which it is screwed, thereby serving to support the conversion apparatus on the exhaust manifold, and a lock nut 62 is provided to be screwed down on the exhaust manifold after the conversion apparatus has been screwed therein. At the opposite end of the circuitous passage 52 from the inlet port 60 the stove or heater 44 is provided with an eduction port 64 for exhaust gases, which is controlled by the exhaust gas valve 36. The heater 44, which is preferably of good heat conducting material, such as an alloy containing a major proportion of copper, is provided with an extensive heat radiating exterior surface, as by being provided with the vertical fins 66 on the side opposite the exhaust valve 36 and the horizontal fins 68 throughout the remainder of its peripheral surface. It also has the dome-shaped head 70 provided with a central heat conducting fin 72.

Inserted within the exterior casting 26 and surrounding the stove or heater 44 is the hollow cylindrical casting 74 which, like the stove 44, is preferably of good heat conducting material, such as copper or copper alloy. The casting 74 is provided with longitudinal ribs 76 and the terminal circumferential rib or ridge 78, and said rib members have a sliding fit within the bore 80 of the casting 26. The longitudinal ribs or partitions 76 are cut away alternately at top and bottom (see Fig. 6) so that the air entering off the hot exhaust pipe through the port 46 passes upwardly through the passage 82, downwardly through the adjacent passages 84, 84, upwardly through the next adjacent passages 86, 86 and downwardly through the passage 88 on the side opposite passage 82. The cylindrical casting 74 is provided with the air port 90 which communicates with passage 88. The extent of opening of air port 90 is controlled by the air sleeve valve 34, and also under certain circumstance by the valve 36, as will be pointed out below. By passage through the circuitous channel about and in contact with the ring casting 74 of copper or the like, which is heated from the stove 44, the entering air is brought to a relatively high temperature during its travel from inlet at 46 to the air port 90.

The top or dome casting 92 is put in place after the heater 44, ring casting 74 and quantity valve 30 have been inserted, and is held in place by the screws 94, the parts being held in accurate registration to one another by dowel pins 96 passing through openings in the dome casting and into the holes 98 (Fig. 2) formed partly in the main casting 26 and partly in the ring casting 74. The dome casting 92 is cored out to provide a passage 100 therein, which affords communication from the space over and about the heater 44 to the valve port 102 controlled by the quantity poppet valve 30. Means for resiliently holding said valve 30 to its seat may comprise a leaf spring 104 clamped to the dome casting 92 by bolt 106.

The space 108 beneath the valve 30 communicates with the eduction pipe 24. In order to adapt the device to installation in various relations and assemblies and to provide for connection of other parts, such as the injector hereinafter referred to, the projecting portion 28 of casting 26 containing the valve 30 is bored cross-wise as shown at 110 and the eduction pipe 24 may be connected at either end thereof, a plug 111 being inserted in the end not used for the eduction pipe.

An adjustable bleeding aperture is provided to permit the passage of hot gases from the mixing chamber 112 surrounding the stove 44 and including passage 100 in the dome casting 92, which forms in effect part of such mixing chamber and affording an outlet past the quatnity valve 30 into the eduction passage 108 leading into pipe 24. In the construction shown, the passage 100 has a short communicating passage 114 extending therefrom and a hole 116 is drilled from said lateral extension 114 through the wall 118, thereby affording communication between the spaces 100 and 108 for permitting the bleeding of hot gas to the intake pipe. For adjusting the opening of aperture 116 screw needle valve 120 is provided, which may be locked when adjusted to the proper position by means of a set screw 122.

The air sleeve valve 34, the exhaust valve 36 and the quantity poppet valve 30 are operated by a single rotatable cam and sector member 130. Said member 130 has a clearance surface 131, a radial or dwell surface 132 and a cam surface 134 for imparting movement to the quantity poppet valve 30 against the spring 104 by coaction with the valve stem 136. Said rotatable member 130 is doweled by pin 138 to the shaft 140. The dowel pin 138 is screw threaded on its end to facilitate withdrawal by screwing a nut thereon. The shaft 140 on which rotatable member 130 is mounted is made reversible and extends through two like bearings 142 in the upepr part of boss 32 on the casing member 26. As shown the shaft 140 has an operating crank arm 144 held by a split bolted together clamp one one end and also has a return spiral spring 146 at the opposite end, said spring being attached to the shaft 140 by the split bolted on clamp 148, the opposite end of spring 146 being received in the hole 150 in the bearing member 142. A like hole 150 is provided in the remaining bearing member 142 and, as will be apparent from Fig. 7, the parts can be readily reversed and the positions of crank arm 144 and spring clamp 148 interchanged, should conditions call for such reversal in installation on any particular make of engine. The spring clamp 148 is provided with radial holes 152 and by inserting a pin therein it can be adjusted and reclamped on shaft 140 to obtain any desired amount of tension on spring 146.

Crank arm 144 is connected to the throttle actuating means so that the conversion device is automatically operated with the throttle and without requiring attention of the operator to any additional control means other than those ordinarily supplied. In the form shown this connection is to the throttle lever 154 by the flexible wire 156 running in tube 158, throttle lever 154 being actuated from a hand lever and/or foot pedal through the usual link 160.

Rotatable member 130 has sector teeth 162 meshing with the rack teeth 164 in the air sleeve valve 34, which has a reciprocating sliding movement in the bore 166 in the boss 32 of casing casting 26, and is positively actuated in both directions by the rotary sector member 130. The bore 166 is formed or finished in boss 32 and also through the wall of ring casting 74 to provide air port 90 and through the adjacent wall of the chambered stove member 44 to provide exhaust gas port 64 after the parts have been assembled and doweled together so that accurate registration is secured and maintained under all circumstances, including taking down and reassembling the conversion apparatus parts. Where the bore 166 extends into the well 56 of stove member 44, it is preferably finished off square as shown at 168 to afford a positive stop for the inward movement of exhaust gas valve 36. Said exhaust gas valve 36 is slidable in and out in the bore 170 formed in the air sleeve valve 34 and preferably has a lost motion connection therewith. In the form shown such connection is obtained by the sleeve air valve 34 being interposed between shoulder 172 on exhaust gas valve 36 and the lock nuts 174 on the screw threaded stem 176 of valve 36. The extent of such lost motion may be varied by adjusting the lock nuts 174.

Exhaust gas valve 36 is held from turning by means of the pin or screw 178 inserted through the air sleeve valve 34 and working against the flat 180 on the valve 36. Air sleeve valve 34 is held from turning by its flat engagement with the teeth 162 of pinion 130.

The cleaning pin 182 extends through the bore 184 of exhaust gas valve 36 and is adjustably supported on its outer end by the split bolted together clamp 186 which is of sleeve formation and is secured to the casting boss 32, as by means of screws 188 (Figs. 2 and 8).

A spring 189 encircling cleaning pin 182 within the sleeve clamp member 186 is interposed between the outer end of the exhaust gas valve stem 182 and the clamp member 186 and serves for resiliently forcing the exhaust gas valve 36 toward closed position, that is to say, in contact with the stop 168. A cover plate 187 preferably made of sheet metal is screw fastened to the portion of the clamp member 186 adjacent to the end of boss 32 and serves to enclose the pinion and cam member 130 and to prevent access of dust, dirt, oil, etc., to the working parts.

Fig. 3 shows the positions of the various movable parts of the conversion apparatus corresponding to the closed or idling position of the engine throttle, and Fig. 12 shows the positions thereof corresponding to the wide open position of the engine throttle, and in Fig. 13 the upper view (provided for convenient comparison) shows the same position as in Fig. 3, while the middle and lower views in Fig. 13 show intermediate positions between those shown in Figs. 3 and 12.

In the closed position of valve 36 (Fig. 3) the bleeder hole 190 leading out of bore 184 in the exhaust gas valve stem 176 is open permitting the passage of a minimum quantity of exhaust gas into the mixing chamber 112. At the same time air is admitted in restricted volume from the hot air inlet passage 88 through the air port 90 into the mixing chamber 112, the air sleeve valve 34 being initially open somewhat as shown in Fig. 3. The poppet quantity valve 30 being closed, the quantity of hot gas admitted to the intake pipe above the throttle is only that going past the needle valve 120. This hot gas is principally air. The air is heated by slow travel through passages 82–88 and the exhaust gas bled is practically only that required to secure circulation of the exhaust gases to supply the necessary heat without undue dilution by excess of exhaust gas.

The first rotative movement of the rotatable member 130 corresponding to low engine throttle openings serves to gradually further open the air valve 34, but the exhaust gas valve 36 does not begin to open until the relative lost motion is taken up by the air valve 34 coming into engagement with the stop lock nuts 174. In the meantime, however, the bleed hole 190 remains open, permitting the passage of exhaust gas in quantity sufficient to secure circulation in the heater and the consequent efficient heating of the air which is mingled with a minimum quantity of exhaust gas. In this way hot gas is fed past the poppet quantity valve 30, which opens to some extent with the rotation of member 130.

Upon further turning of member 130 the exhaust gas valve 36 begins to open. It will be noted that the opening of the exhaust gas valve is gradual, the disk like head 37 thereof having its sliding movement in an opening formed in a cylndrical surface, so that the port 64 is open on each of the sides thereof before it has become finally opened in the middle or top and bottom. As the valve motion continues toward position corresponding to open engine throttle position shown in Fig. 12, both valves 34 and 36 moving together after sleeve valve 34 has come into contact with the stop member 174, the bleed hole 190 is closed by the relatively stationary cleaning pin 182 which also serves to push out any material which may have clogged or tended to clog the passage in the exhaust valve.

At positions of the engine throttle where detonation may otherwise occur and which may be at or towards wide open throttle in low compression engines and at earlier throttle openings in high compression engines, the air port 90 is closed. This closing action, however, is not accomplished by the member 34, which has so far been denominated the air valve, but is accomplished by the head 37 of member 36 heretofore referred to as the exhaust gas valve, which, therefore, serves not only for controlling the admission of exhaust gas in measured quantities sufficient to prevent detonation, but the same valve 36 also serves to cut off the admission of the air by entering and closing port 90 when the valve 36 is moved a sufficient distance. The quantity poppet valve 30 comes into its position of maximum opening upon the continued turning of the rotary member 130, as will be apparent from the showing in Fig. 12, corresponding to open position of the engine throttle and in which figure the exhaust gas valve 36 has opened the exhaust gas port 64 and shut off the air admission port 90, and the poppet quantity valve 30 is in its position of maximum opening.

It will be apparent that by adjustment of the various parts, including the cleaning pin 182, the adjustable lock nuts 174 and the needle valve 120, the time and extent of valve opening can be controlled as may be requisite to suit the needs of the particular engine to which the conversion apparatus is applied. It is essential that each of these adjustments be supplied in a device intended for attachment to various engines as in every case the gas proportions and quantities are critical and with greater or less than the right openings or adjustments the highest beneficial results are not to be secured. In idling and low throttle positions the exhaust gas must be sufficient to supply the required heat, but not enough to cause harmful dilution, whereas at throttle openings where detonation will otherwise occur the exhaust gas must be sufficient to minimize detonation and yet not enough to cause harmful dilution and at such times the air which would increase detonation must be shut off.

The operation of apparatus as so far described may be briefly reviewed as follows: Hot air from off the exhaust manifold is admitted through port 46 and heated by its relative slow back and forth circuitous passage between the outer and next to the outer members of the conversion apparatus and is delivered through port 90 to the mixing chamber 112. Exhaust gas enters the stove 44 through the inlet 60 and passes therethrough in circuitous fashion to the bottom of the well 56, whence it passes into the mixing chamber either through the bleed opening 190 or through the port 64 past the exhaust gas valve 36 when the latter is open. This mixture of hot exhaust gas and hot air is further heated by being passed through the mixing chamber between the stove 44 highly heated by the circulation of hot exhaust gas and the next outer wall member of the conversion apparatus, namely, the ring member 74. The heated gas mixture so provided passes to the engine intake manifold above the throttle, passing either or both of the openings controlled by the set needle valve 120 and the poppet quantity valve 30. The arrangement is such that at and toward closed engine throttle positions the exhaust gas valve and the poppet quantity valve are closed and only the bleed hole 190 and the air port controlled by valve 34 are open, the latter being intially partially opened. Thus at idling a mixture of hot air and some exhaust gas is fed past the set needle valve 120 to the engine cylinders. The delivery of heat to the engine intake is, however, relatively very considerable at this stage since the suction on the bleed hole 190 is that existing above the throttle and such suction is substantially a maximum at and toward closed position of the engine throttle.

As the engine throttle is opened the air valve is further opened, the exhaust gas valve remaining closed, the exhaust gas delivered being only that passing through the bleed hole 190. The poppet quantity valve 30 has at this time been opened by its stem being actuated by the dwell cam portion 132 of uniform radius, giving a uniform opening of said quantity valve 30 until it is opened further by the eccentric or camming portion 134 of rotary member 130. At still further openings of the engine throttle, the air is shut off and additional exhaust gas admitted, both these effects being obtained by movement of the single valve 36, and the quantity poppet valve 30 is still further opened by means of the camming surface 134 so that at the positions of the engine throttle where detonation may be expected to occur the admission of air, which appears to promote instead of inhibiting detonation, through the conversion device is cut off, and all that is admitted is a sufficient quantity of the exhaust gas to prevent detonation. The extent of opening of the exhaust gas valve and the size of the parts are so selected and adjusted as to secure the admission of the proper quantity of exhaust gas to prevent detonation without unduly diluting the mixture whereby extensive loss of power might result.

The chambered copper heater or stove which communicates with the exhaust manifold may advantageously have a return opening to the exhaust manifold in addition to the bleeding aperture or port leading to the intake manifold beyond the throttle. With such arrangement there is in addition to the exhaust gas passing to and through such port or aperture a considerable further portion of exhaust gases which pass through the heater and back to the exhaust manifold and contribute materially to the delivery of heat to the heater walls and to the mixture in contact therewith. This effect can be increased by constructing and arranging the ports so as to scoop or direct the exhaust gases into the stove and/or so as to utilize the flow of gases in the exhaust manifold to create a suction or partial vacuum at the return port. Such construction is illustrated in Fig. 19 in which view stove 44' has a transverse septum 58' extending across the chamber in the stove from near its inner end to and beyond the outer end of neck 42'. In Fig. 19 the projecting portion of septum 58' extending into the exhaust manifold 12 is formed with a shovel like projection 202 projecting against the direction of movement of exhaust gases in manifold 12 and is also formed with an oppositely extended projection 204 on its rearmost side. With such arrangement, in addition to the mere passage of exhaust gas in through port 206 and out past valve 36 or bleeder hole 190, (if provided, the bleeder hole being omitted in the showing of Fig. 23) an extra circulation takes place around the septum 58', a portion of the hot exhaust gas passing back to the exhaust manifold by the outlet port 208 where the pressure is decreased as compared with that at inlet port 206. The quantity of exhaust gas so circulated is quite considerable, and delivery of heat to stove 44' is highly effective. The passage 210 leading to outlet port 208 may be somewhat constricted as compared to the interior portions 212, 214 of the chamber in the stove because part of the gases passing through the interior of the stove are taken out at 36 and heat is more effectually given off by slowing down the speed in the chambered part of larger section.

A further modification is shown in Fig. 20 in which the shovel lip 202 is dispensed with and the downstream lip 204' is retained. In this case suction at the reentrance port 208' and outlet of gases at 36 is relied on to create circulation of the exhaust gases and to cause them to enter inlet port 206'.

In the showing of Fig. 23, bleeder hole 190 is dispensed with, and the exhaust valve made solid. With such construction the circulation of exhaust gas through the heater is that produced by the scoop or shovel effect at inlet port 206 and relatively lower pressure at outlet port 208 until the valve 36$^b$ is opened and at such times the circulation also includes gases moving past the seat of valve 36$^b$ and ultimately to the intake manifold and engine cylinders.

At partial throttle openings there is a close interrelation between the means for supplying hot gases beyond the intake and the temperature and degree of opening of air supplied to the carburetor. In general at partial throttle openings in order to obtain the increased power and economy which may be obtained with the conversion apparatus the air supply to the carburetor must be cut down unless such air is preheated, as by the usual exhaust conduit sleeve heater 18, in which case the air inlet passage to the carburetor need not be restricted to a greater extent than is the case with the same carburetor without the use of the conversion device.

This relation, however, does not obtain at and toward open throttle. At such increased throttle openings and preheating of the air to the carburetor air inlet or the constriction of such inlet should preferably be dispensed with and the full carburetor air inlet supply of air made available at atmospheric temperature, whereby full volumetric efficiency can be obtained.

I have shown means for automatically securing such operation in Figs. 24 and 25. In the construction shown in Fig. 24 the throttle lever 154 is connected by link 220 to the operating crank 222 of the carburetor air inlet choke valve 224. The arrangement is such that the choke valve 224 is partially closed at partial throttle openings, but is wide open when the throttle is at or toward its wide open position. The link 222 may include a spring portion or lost motion connection to permit the throttle to open further after the choke valve is fully open. With such arrangement air at atmospheric temperature is supplied to the carburetor air inlet for all throttle openings, and no sleeve or other preheater for the carburetor air is made use of.

A construction such as shown in Fig. 25 is preferably made use of when preheated air is to be supplied to the carburetor at partial throttle openings, and air at atmospheric temperature at and toward wide open throttle. In this construction the throttle valve lever 154 at or about half open throttle position comes into contact with the lever 226 which operates an inlet valve 228 for admitting atmospheric air to the carburetor air inlet through the link 230 and crank arm 232. Valve 228 is held closed by spring 234 during the times when the throttle is in partially open positions and at such times the air to the carburetor air inlet is preheated by means of the sleeve heater 18, the air inlet passage to the carburetor being wide open.

It will be seen that in these or other ways I may provide means for adapting the temperature and passage opening of the air to the carburetor so that, after the fuel is taken up by the air stream, the fuel mixture is in such state that when the highly heated gases from the conversion apparatus are brought into contact and admixture therewith, the desired results in the way of increased power and economy can be obtained therefrom. In one case where the engine running without the conversion apparatus and with 1/8 throttle opening developed a dynamometer torque of only 15 pounds at 600 R. P. M. with the choke valve open, and with practically no discernible difference in running whether the carburetor inlet air was or was not preheated. I found that, with the conversion apparatus in use, and the same throttle opening, the speed at 15 pounds torque was increased to 1,200 R. P. M. or, when the speed was held to 600 R. P. M., the torque was increased to 30 pounds; provided I either preheated the carburetor inlet air by means of the sleeve heater leaving the inlet passage wide open, or without preheating the air, I cut down the air inlet passage to the carburetor about 1/3, but that under other conditions as to carburetor air inlet and temperature there was little or no advantage obtained by use of the conversion apparatus. In fact when it was attempted to operate the engine with the conversion apparatus in use and the air inlet wide open with air at atmospheric temperature the engine would stop. Also the engine would stop when it was attempted to operate the engine without the use of the conversion apparatus and the choke valve closed off 1/3 admitting air at atmospheric temperature. It results that when using the conversion apparatus the necessity for supplying preheat to carburetor air varies substantially directly or in the same sense with the air volume or substantially inversely to the extent of opening of the carburetor air passage.

In the construction of apparatus in accordance with my invention the various dimensions appearing in the drawings, which are to scale, should preferably be closely followed in order to obtain satisfactory results. As a basis of scale or size determination it may be observed that for the usual automobile engine of say 25–30 H. P., S. A.E. rating, the seat diameter of poppet quantity valve 30 is one-half inch, and the opening of such valve by the dwell cam surface 132 is .020 of an inch.

Operation of the apparatus embodying the features above described has disclosed the fact that the greatest advantages obtained in the way of economy and increase of power are secured at the partial engine throttle openings and that at and toward open throttle, while detonation is substantially prevented, the gains in the direction of economy and power are relatively not so great as at the partial throttle openings.

This appears to be due largely to the fact that with the opening of the engine throttle there is a substantial balancing of suction above and below the engine throttle and a consequent reduction of the suction acting upon the conversion apparatus, while at the same time a greater quantity of fuel mixture is delivered to the engine cylinder. Thus there is a relative reduction in delivery of heat units from the conversion apparatus for a given volume of the fuel mixture delivered by the carburetor.

I have, therefore, devised means for securing a delivery of additional heat units to the intake pipe through the conversion apparatus at such times. The apparatus for this purpose, which may be used without the conversion apparatus or in combination therewith as herein disclosed, forms the subject matter of a separate application filed April 29, 1925, Serial No. 26,618 and same is not claimed herein per se. The claims for such apparatus other than in combination with the conversion device are contained in the said companion application.

According to this feature of the invention provision is made for "boosting" the delivery of the conversion device gases to the intake by means of highly heated gases from the engine cylinders made use of when during the power stroke the pressure in the engine cylinders exceeds a predetermined minimum amount. In this way detonation is prevented in two directions; first, by relief of unduly high pressures in the engine cylinder, and second, by making use of the gases withdrawn from the engine cylinder when such high pressures are encountered therein for injection into the intake manifold, carrying therewith the gases from the conversion apparatus and assuring thorough vaporization of the fuel to dry gas and the delivery of the gases of combustion in the proportion necessary to minimize detonation.

In this way highly beneficial results are secured throughout the entire range of engine throttle opening and engine operation. The delivery of heat units to the incoming charge at and toward wide open throttle positions is secured and the relative diminution in heat delivered at and toward wide open throttle positions characteristic of the conversion apparatus without such a boosting device is eliminated and the necessary delivery of heat units for a given quantity of fuel and air mixture from the carburetor is secured at wide open throttle positions as well as at lower throttle openings.

The modification referred to is illustrated in Figs. 14–18 inclusive. Reference character 240 designates a third manifold of relatively small section as compared to the intake and exhaust manifolds connected to the engine cylinders by the spring check valve casings 242. The manifold 240 delivers to the injector nozzle 244, which may be inserted in the conversion apparatus casing in place of the pipe plug 111 which was described as used to close one of the threaded openings in bore 110 of the conversion apparatus, said nozzle 244 being directed into the entrance to the conversion apparatus delivery pipe 24.

The injector is provided with a needle control valve 246 controlling the quantity of engine cylinder gases delivered to the injector. The screw head of the needle valve 246 is preferably covered by the cap 248 to prevent same being tampered with after being properly adjusted and the lock screw 250 is provided to lock it in adjusted position.

Valve casings 242 which are screwed into the engine cylinder, preferably in place of the usual pet cocks, are so constructed as to permit the passage of engine gases only when the pressure in the cylinder exceeds a predetermined amount, which is always in substantial excess of the highest compression pressure to be encountered in a particular engine. In the form shown same comprises a casting 252 having a screw threaded neck 254 which may be screwed in the engine cylinder, preferably into the pet cock hole. Member 252 contains the preferably ball valve 256 adapted to be seated against a seat 258, a follower 260 which is held against the ball valve by the spring 262. The tension of spring 262 is adjusted by screwing the plug 264 in or out, and the plug 264 is locked in adjusted position by a lock screw 266. Stop means are provided for limiting the extent of opening of the ball valve 256. In the form shown same comprises a screw pin 268 screwed in plug 264 and extending through aligned openings therein and in the follower member 260. Pin 268 is locked in adjusted position by locking screw 270 and a cap 272 is preferably provided enclosing the adjusting parts so that the adjustment once made will not be unnecessarily tampered with or disturbed.

When this high pressure injector system is made use of in conjunction with the conversion apparatus the portion of delivery pipe 24 projecting into the intake beyond the throttle valve is preferably directed toward the engine cylinders as is shown at 274, thus serving to promote movement of gases toward the engine cylinders and exerting to some extent at least an injection action upon the mixture of fuel and air delivered by the carburetor and assisting in the delivery of same into the intake and engine cylinders. The valve casings 242 are freely exposed to the air and arranged in the path of air from the fan, whereby they are prevented from becoming too highly heated and are provided with cooling fins 276, but additional air or water cooling means for the valve casings 202 may be resorted to, if desired.

The spring pressure on ball valve 256 is so adjusted that the valve is not opened on the compression stroke even when the compression pressures are the highest. Under these circumstances it, of course, does not open on the exhaust stroke during which the pressures are relatively low and being in the nature of a check valve it, of course, does not open on the suction stroke, so that it is open only during that part of the power stroke when the pressure in the cylinders exceeds that for which the valve is set. When the pressure in the engine cylinders on the power stroke does not exceed the pressure for which the valve 216 is set the high pressure injector system is not operating and the delivery of gases to the intake is only by means of the conversion apparatus itself as has hereinbefore been described. The high pressure injection system, however, when it does come into action materially supplements the delivery of gases to the engine cylinder for preventing detonation, insures the delivery even at open throttle positions of the heat units necessary for obtaining thorough vaporization of the fuel, which is being introduced in relatively large quantities, and accomplishes this without introducing excessive quantities of exhaust gas, which would materially interfere with the production of power and in addition to converting the fuel and air mixture delivered by the carburetor into a highly heated thoroughly vaporized gas and with sufficient products of combustion mingled therewith to materially decrease detonating effects in the engine, also serves to relieve any unduly high pressure pressure wave in the engine cylinders, which would cause detonation. Thus the momentary periods of extremely high pressure in the engine cylinder characteristic of detonation are not merely relieved with a consequent direct reduction in detonating effects produced, but the highly heated gases under high pressures which are withdrawn to reduce detonation are themselves made use of to further prevent detonating effects by introduction into the cylinder with the charge.

The constructions shown and described are for the purpose of affording an understanding of the invention, which is of the scope defined by my claims in which I intend to cover all that is novel in view of the prior art.

I claim:

1. The combination in an internal combustion engine of means for supplying exhaust gases from the engine exhaust manifold to the intake, and means for supplying gases direct from an engine cylinder into admixture with said exhaust gases and delivering same therewith to the intake.

2. The combination in an internal combustion engine of means for supplying to the intake a mixture of exhaust gas and air, and means for augmenting and accelerating the flow thereof comprising a constricted outlet for engine gases from the engine cylinder.

3. In an internal combustion engine, means for delivering at all throttle positions hot gas into the intake beyond the throttle in quantities adapted for engine idling, and supplementary valved means coming into action as the throttle is opened beyond idling for delivering additional quantities of hot gas to the intake beyond the throttle.

4. In an internal combustion engine, means for delivering hot gas through a set opening into the intake beyond the throttle at all throttle positions, and means including a valve opening in the same sense as the engine throttle for delivering additional quantities of hot gas to the intake beyond the throttle when and after the throttle opening exceeds a predetermined extent.

5. In apparatus for delivering mixed hot gases including exhaust gas to the intake of an internal combustion engine beyond the throttle, means operating automatically adjunctively to throttling for proportioning the mixture comprising a valve which, upon being opened to admit one component of the mixed hot gases, shuts off the supply of another component gas.

6. In apparatus for delivering hot gases to the intake of an internal combustion engine beyond the throttle comprising exhaust gas and hot air, means operating automatically adjunctively to throttling for proportioning the mixture comprising a valve which, upon being opened for exhaust gas, serves to shut off the air supply.

7. The combination with means for delivering to the intake of an internal combustion engine hot gases comprising exhaust gas from the exhaust manifold, of means for augmenting such delivery by the pressure in the engine cylinder on the power stroke.

8. In an internal combustion engine, means for admixing hot air and hot exhaust gas and delivering same to the intake beyond the throttle, and means for augmenting said gas delivery comprising means of pressure relief from the engine cylinders on the power stroke.

9. Apparatus for supplying a mixture of exhaust gas and hot air to the intake of an internal combustion engine comprising inlet means for leading exhaust gas and air into the engine intake, and valve means for controlling said inlet means comprising a sleeve air valve having rack teeth thereon, operating means therefor comprising a pinion meshing with the rack teeth, a second valve in the bore of the first named valve and having a lost motion connection therewith, whereby the air valve may move for a distance before the second valve is moved, an exhaust gas port governed by the second valve, said second valve serving also when the exhaust port is open to close the port of the air valve.

10. In apparatus for supplying exhaust gas and hot air to the intake of an internal combustion engine, inlet means for introducing exhaust gas and air into the engine intake, and valve means for controlling said valve inlet means comprising an air valve of sleeve formation, means for positively moving same to and fro, an exhaust gas valve, spring means for normally holding same to its seat, and means whereby the air valve after initially moving alone serves to open the exhaust gas valve.

11. In conversion apparatus for internal combustion engines, means for admitting to the intake beyond the throttle a minimum quantity of hot gases suitable for engine idling and operative as well at throttle positions other than idling, means for admitting to the intake beyond the throttle at partial throttle openings a mixture of hot air and hot exhaust gas, and means operable at and toward open throttle for admitting hot gases of combustion only and without air to the intake beyond the throttle.

12. In an internal combustion engine comprising intake and exhaust manifolds and a carburetor, a stove on the exhaust manifold, means for admitting air heated therefrom to the carburetor air inlet at partial throttle openings, means for changing the air supply to atmospheric temperature at and toward open throttle positions, means for introducing into the intake beyond the throttle heated air and exhaust gas at partial throttle openings and for introducing thereat exhaust gas in increased quantities without air at and toward open throttle positions.

13. In an internal combustion engine of the Otto type, comprising intake and exhaust manifolds and carburetor, means operable at partial throttle openings for heating the air supplied to the carburetor air inlet, means for admitting at like throttle openings highly heated air to the intake beyond the throttle, means operable at and toward open throttle for supplying air at atmospheric temperature to the carburetor air inlet, and means operable at like throttle positions for supplying exhaust gas without air to the intake beyond the throttle.

14. In fuel conversion apparatus for multi-cylinder internal combustion engines of the Otto type comprising intake and exhaust manifolds and carburetor, means for introducing to the intake beyond the throttle for low throttle openings highly heated air, at somewhat higher throttle openings a mixture of exhaust gas and more air, and at and toward open throttle exhaust gas without air.

15. In an internal combustion engine having a fuel suction carburetor, means for supplying gases from the engine cylinders on power stroke and utilizing same for driving other gases therewith into the intake manifold of the engine.

16. In an internal combustion engine having a fuel suction carburetor, means for supplying gases from the clearance space of the engine cylinders above the piston travel and utilizing same for driving other gases therewith into the intake manifold of the engine and discharging same therein toward the cylinders between the carburetor and the engine cylinders.

17. In an internal combustion engine having a fuel suction carburetor, means for releasing gases from the engine cylinders on power stroke after the pressure therein reaches a predetermined minimum and utilizing same for driving other gases therewith into the intake conduit of the engine between the carburetor and the engine cylinders and discharging same therein toward the engine cylinders.

18. In apparatus for supplying a mixture of exhaust gas and air to the intake of an internal combustion engine, a by-pass conduit from exhaust to intake having a branch for admission of air, an air valve, an exhaust gas valve, and means whereby the latter valve serves to shut off the air when the air valve is opened beyond a predetermined extent.

19. Apparatus for supplying mixed hot gases to the intake of an internal combustion engine, comprising a by-pass from exhaust to intake and an air inlet to said by-pass and so related thereto that the gases are brought together in opposite directions, of valve means for controlling the passage of gases through the by-pass and inlet, said valve means comprising an air valve, means for imparting longitudinal movement thereto for controlling passage of air, and an exhaust gas valve sleeved into the air valve and operable through the movement imparted to the air valve.

20. In an internal combustion engine, means for modifying the charge produced by the carburetor comprising an air valve for admitting air to the intake and which is open at all times, and a valve for exhaust gas, which when opened to a predetermined extent serves to shut off the air.

21. In an internal combustion engine, means for modifying the mixture coming from the carburetor comprising an air valve for controlling the proportion of air admitted to the intake when the exhaust gas valve is shut off, and an exhaust gas valve for controlling admission of air to the intake, said exhaust gas valve serving when opened to shut off the air.

22. In an internal combustion engine, means for delivering air, exhaust gas from the exhaust conduit and gases from the engine cylinders on combustion stroke to the engine intake conduit, and utilizing the last-named gas to augment the supply of the before-named gases.

23. In an internal combustion engine, means for delivering hot air, exhaust gas from the exhaust conduit and gases from the engine cylinders on combustion stroke to the engine intake conduit beyond the engine throttle, and utilizing the last-named gas to augment the supply of the before-named gases.

24. The process of forming and delivering charges to the cylinders of an internal combustion engine, which comprises admixing fuel with an air stream, throttling the fuel and air stream on its way to the engine cylinders, delivering exhaust gas of the engine into the fuel and air stream beyond the point of throttling at lower partial throttle openings, and delivering power stroke engine gases thereinto at and toward wide throttle openings.

25. The process of operating an internal combustion engine, which includes the steps of admixing fuel with an air stream, throttling the fuel and air stream on its way to the engine cylinders, delivering engine exhaust gases into the fuel and air stream, and boosting the charges toward the engine cylinders with a portion of the exploding gases at periods of low intake vacuum only.

26. In an internal combustion engine, an exhaust conduit, an intake conduit, a bypass from the exhaust conduit to the intake conduit, means associated with said bypass for heating air and conveying the same thereto, a valve for controlling both the passage of heated air and exhaust gas to the intake conduit; said valve in certain of the positions thereof serving to permit of the passage of said exhaust gas to the intake conduit, and to exclude heated air therefrom.

27. In an internal combustion engine, an intake, a throttle, a conduit for supplying exhaust gas and air to the intake above the throttle, means for controlling the admission of air thereto, means for controlling the admission of exhaust gas thereto, and a lost motion connection between said first named and last named controlling means.

28. In an internal combustion engine, a substantially cylindrical casing, a shell inserted therein and spaced from the walls thereof except for longitudinal ribs, said ribs providing a series of successive lengthwise air passages, a heater within the shell and spaced therefrom to provide a mixing chamber, ports provided from the last air passage and from the heater to the mixing chamber around the heater, valves to control passage of gases through the ports, and a conduit leading from the mixing chamber to the engine cylinders over the throttle.

29. In apparatus for delivering gases including exhaust gas to the intake of an internal combustion engine, means operated adjunctively to throttling for proportioning the mixture comprising a valve which, at certain of the opening thereof for admitting one component of the gases, shuts off the supply of another component gas.

30. In apparatus for delivering exhaust gas and hot air to the intake of an internal combustion engine, means operated adjunctively to throttling for proportioning the mixture comprising a valve which, at certain of the openings thereof for admitting exhaust gas, shuts off the supply of hot air.

In testimony whereof, I have signed my name hereto.

ARLINGTON MOORE.